Nov. 15, 1927.

G. STONE 1,649,752

PIPE SLEEVE

Filed Feb. 13, 1925

Inventor
Gunnard Stone
By Lancaster
Attorney

Patented Nov. 15, 1927.

1,649,752

UNITED STATES PATENT OFFICE.

GUNNARD STONE, OF ISLAND PARK, IDAHO, ASSIGNOR OF ONE-THIRD TO ALBERT PEARSON, OF ISLAND PARK, IDAHO.

PIPE SLEEVE.

Application filed February 13, 1925. Serial No. 9,007.

The present invention relates to pipe fittings, and more specifically to a two part sleeve coupling adapted for use either upon pipe or hose-lines.

The primary object of the invention is to provide an improved pipe sleeve whereby pipe sections may be quickly and efficiently connected together without the necessity of requiring the pipe ends to be threaded.

A further object of the invention is to provide a device which may be readily clamped about a pipe or hose for the purpose of closing a break or leak in the line.

A still further object of the invention is to provide a two part structure of this character embodying an arrangement whereby the parts are effectively hingedly connected together, and the retaining means so arranged that the device may be of relatively no greater outer diameter than the screw threaded sleeves now in common use; thus enabling the installation of pipe lines, requiring no more space than the pipe lines connected by the ordinary type of screw threaded sleeve.

Other objects and advantages of the invention will be apparent during the course of the following detailed description, taken in connection with the accompanying drawing, forming a part of this specification, and in which drawing:—

Figure 1:
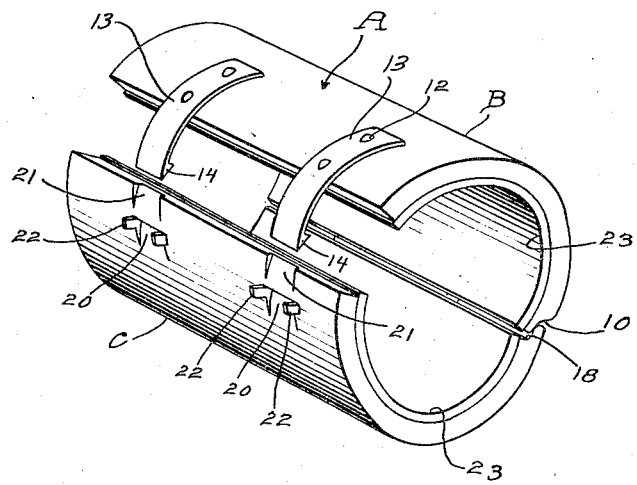
Figure 1 is a perspective view of the improved pipe sleeve, showing the sections in a partially closed position.
Figure 2:
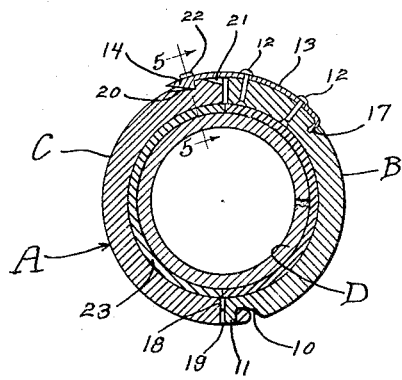
Figure 2 is a transverse section through the sleeve at one of the coupling clasps of the sleeve, and showing the sleeve in a closed and locked position about a pipe section.
Figure 4:
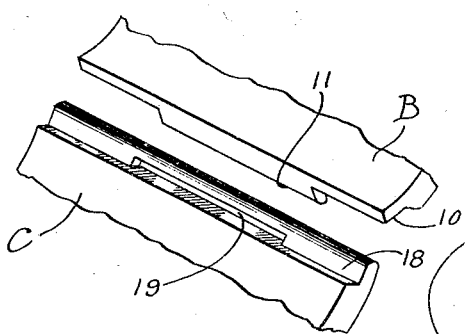
Figure 5:
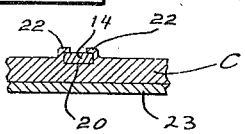

Figure 4 is an inner perspective view of the rear edges of the sleeve sections, and illustrating the hinge construction for hingedly connecting the sections together; the lining being eliminated in this view for the purpose of more clearly illustrating the hinge construction; and Figure 5 is a fragmentary sectional view on line 5—5 of Figure 2, showing the manner of retaining the spring clasps in a closed position.

Referring to the drawing in detail, and wherein similar reference characters designate corresponding parts throughout the several views; the letter A may generally designate the improved pipe sleeve embodying separable sections B and C; and D a section of a pipe or hose.

The sleeve A which is formed of two sections preferably of semi-circular shape in cross section may be formed of any desired material such as metal, wood, or any suitable material in accordance with which the sleeve is to be used.

Referring first to the section B, which is of uniform thickness throughout its body, the same has provided on its outer surface, and at the rear edge thereof, a longitudinally extending rabbet 10 extending throughout the entire length of the section. Formed in this rabbet 10, at the extreme rear edge of the section and terminating short of each end of the rabbet, is a longitudinally extending tongue 11 having its free outer edge lying in a radial plane with the outer surface of the section. Secured to the outer surface of the section B at the forward edge thereof, as by rivets or suitable fastening means 12, are spring clasps 13 which extend beyond the forward edge of the section with a like curvature as that of the section, and have provided at their projecting free ends wedge shaped hook portions 14 having rearwardly inclined inner surfaces 15 providing shoulders 16 at the inner side of the clasps. These clasps 13 may have their rear end portions bent inwardly and inserted into recesses 17 provided in the sleeve section for aiding in further anchoring the clasps to the section. If desired, the sleeve section B may be recessed on its outer forward surface, so that the clasps may be seated in the recesses with their outer surfaces lying flush with the outer surface of the section. Such construction is not entirely essential however, since the relatively thin flat spring material from which the clasps may be formed will not materially increase the outer diameter of the sleeves when being used in places of limited area.

Referring now to the companion section C, the same has provided on its inner surface, and at the rear edge thereof, a longitudinally extending rabbet 18 extending throughout the entire length of the section, and which rabbet is provided with an elongated longitudinally extending aperture 19 for receiving the tongue 11 of the section B when assembling the sleeve sections about a pipe or hose. Disposed in spaced relation from the forward edge of the section C, and in alignment with the spring clasps 13, are recesses or depressions 20 conforming to the general shape of the wedge shaped hook portions 14 of the clasps, and into which the hook portions are adapted to fit when the sleeve sections are in assembled relation. Disposed at the extreme forward edge of the section C, and in alignment with each recess 20, are beveled guideways 21 which facilitate the sliding of the spring clasps 13 into the recesses when assembling the sleeve sections into operative relation about a pipe.

Formed integrally with the section C, and disposed in longitudinal alignment at each side of the recesses 20, are bendable lugs or tabs 22 which are adapted to be bent or clinched over the hooked ends of the spring clasps 13, as illustrated in Figure 5, for preventing accidental displacement of the clasps from the recesses.

A suitable compressible packing or lining 23 may be provided inwardly of each of the sleeve sections, and have its longitudinal edges project slightly beyond the front and rear edges of the sections so that when the sections are in assembled relation, a tight joint will be formed along the meeting edges of the sections.

Figure 3:
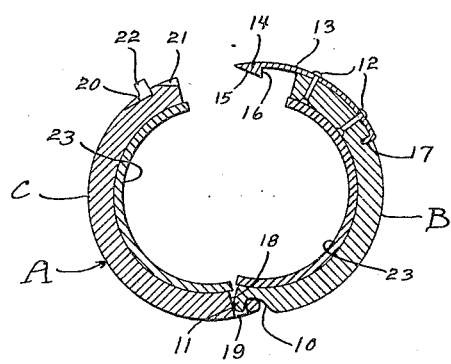
Figure 3 is a transverse section through the sleeve at a like point to that in Figure 2, and showing the sleeve in a partially closed position.

In assembling the sleeve about a pipe or hose, the sections may be first placed about the member, with the tongue 11 started into the opening 19 as illustrated in Figure 3, and by then bringing the forward edges of the sections into confronting relation, the clasps 13 will engage in a holding position in the recesses 20 for rigidly clamping the sections about the member. The lugs 22 may then be clinched over the ends of the clasps for preventing accidental displacement of the clasps. Should it become desirable to remove the sleeve from the pipe, the lugs 22 may first be bent out of holding engagement with the clasps, and then by inserting a screw driver or the like beneath the wedge shaped hooks 14, the hooks may be sprung out of holding engagement in the recesses 20.

While merely two clasps and companion coacting recesses have been shown by way of example, it is to be understood that any number of clasps and coacting recesses may be provided should the sleeve be of considerable length.

Various minor changes may be made to the form of the invention herein shown and described, without departing from the spirit of the invention, or the scope of the following claims.

I claim:

1. A sleeve coupling comprising a tubular member divided longitudinally into separable sections, means for hingedly and detachably connecting the sections together along their rear edges, yieldable clasps carried by the forward edge of one of said sections and having projecting portions adapted to yieldably seat in recesses provided in the companion section, and bendable lugs formed integral with the companion section and disposed at opposite sides of said recesses adapted to be clinched about the free ends of the clasps for preventing withdrawal of the clasps from the recesses.

2. A sleeve coupling comprising a pair of semicircular shaped sections of uniform thickness throughout their bodies, one of said sections being formed at its inner surface and at the rear edge thereof with a longitudinally extending rabbet one wall of which is provided with an elongated aperture extending longitudinally of the rabbet, and said companion section being formed at its outer surface and at the rear edge thereof with a longitudinally extending rabbet provided at its longitudinal marginal edge with an elongated tongue having its free outer edge lying inwardly of the circumferential face of the section, said tongue when the sections are in assembled relation fitting into said aperture of the companion section for hingedly and detachably connecting the sections together, and means detachably joining the forward edges of the sections for retaining the sections in tubular formation.

3. A sleeve coupling comprising separable semicircular shaped sections having complementary rabbets at their rear edges and extending thruout the length of the sections, a radially extending tongue integral with and disposed longitudinally of the projection provided by the rabbeting of one of the sections and adapted for engagement in an elongated opening provided in the projection formed by the rabbeting of the companion section, and means for detachably connecting the forward edges of said sections for locking the sections in tubular formation.

GUNNARD STONE.